Sept. 6, 1966  M. VACANTE  3,271,045
STEERING WHEEL MECHANISM
Filed April 22, 1965  2 Sheets-Sheet 1

INVENTOR.
MATTHEW VACANTE
BY

United States Patent Office 3,271,045
Patented Sept. 6, 1966

3,271,045
STEERING WHEEL MECHANISM
Matthew Vacante, Old Bethpage, N.Y., assignor to Postless Steering By Dual Wheels Co., Inc., Baldwin, N.Y.
Filed Apr. 22, 1965, Ser. No. 450,030
1 Claim. (Cl. 280—87)

This application is an improvement of my prior application, Serial No. 220,256, filed August 29, 1962 of the same title, now Patent No. 3,186,729, granted June 1, 1965.

The present invention relates to automotive steering wheels, and more particular to a novel steering mechanism which is adapted to afford easier maneuverability of the vehicle while considerably reducing the lethal hazards of accidents.

My prior application showed a steering wheel mechanism comprising two hand wheels mounted on a horizontal axis in front of the driver, the wheels being connected to steering the vehicle and eliminating the steering post.

The present application shows an improvement of my prior device wherein the hand wheels are located at the sides of the drivers seat. The present application also discloses a flexible shaft connecting means between the steering wheel means and the conventional steering linkage adjacent the wheels.

It is well established in the field of automotive vehicles that the orthodox steering post, used for a number of decades without substantial changes, may be a deadly hazard when a vehicle is involved in an accident. The sudden loss of speed of a vehicle, due either to intensive braking or to a collision, tends to hurl the driver forward, exactly in the direction the steering post.

Insurance statistics have proven beyond doubt that the hazard presented by steering column or post protruding toward the chest and stomach of the driver should be eliminated.

Attempts have been made in the automotive field to solve this problem by the provision of sunken steering wheels. Also, some car manufacturers have made the wheel proper resilient or have attached it to the steering column in a fashion as to yield in case the car is involved in an accident. These solutions are only partial and while offering only superficial solutions, tend to render driving uncertain or tirsesome.

Another disadvantage of the known steering wheel consists in the circumstance that the driver's view is partly obstructed both in the direction on the road and toward the instrument panel, part of which is usually hidden by the wheel proper.

Accordingly, a principal object of the invention is to provide new and improved steering means comprising a pair of hand wheels mounted on either side of the drivers seat.

Another object of the invention is to provide a new and safe and advantageous dual steering wheel which substantially eliminates the aforementioned drawbacks of known arrangements.

It is one of the major objects to avoid the use of a steering post and of any element which may endanger the driver's safety. In addition, the invention envisages to offer a better overall view toward the road and the instrument panel, making for an easier and less tiresome operation of the vehicle.

It is another object of the present invention to make for easier servicing and access of the instrument panel and the electrical wiring usually concealed therebehind. Furthermore, the invention allows to locate certain controls and/or indicators, e.g., the shifting gear push buttons and/or the speedometer dial in a location right in front of the driver.

According to one of the major features of the invention, the steering post or column is eliminated and replaced by drive means which lead preferably to the cowl panel of the vehicle. Instead of a steering wheel facing the driver in a plane more or less parallel to his chest, the present invention provides a dual wheel structure comprising two vertical wheel members having planes substantially beside the driver's body.

It is another major feature of the invention that the two, preferably parallel, wheel members are interconnected to rotate in opposite directions. Thus, for example, the wheel member closer to the right hand of the driver may be rotated with its top edge forward, that is in a clockwise direction if viewed from the right; at the same time, the wheel member facing the driver's left hand will rotate in a counterclockwise direction, that is with its bottom edge in a forward direction. The aforementioned movement of the dual wheel, executed either with the right hand or the left hand of the driver in said respective directions, can be used for making a left turn with the vehicle; conversely, the vehicle may make a right turn when the left hand wheel member is rotated top forward (clockwise) while the right hand member rotates oppositely. It will be understood that the reverse arrangement may also be adopted, if this should prove more convenient.

Further objects and advantages will become apparent from the following description of the invention taken in conjunction with the figures, in which.

Figure 1:
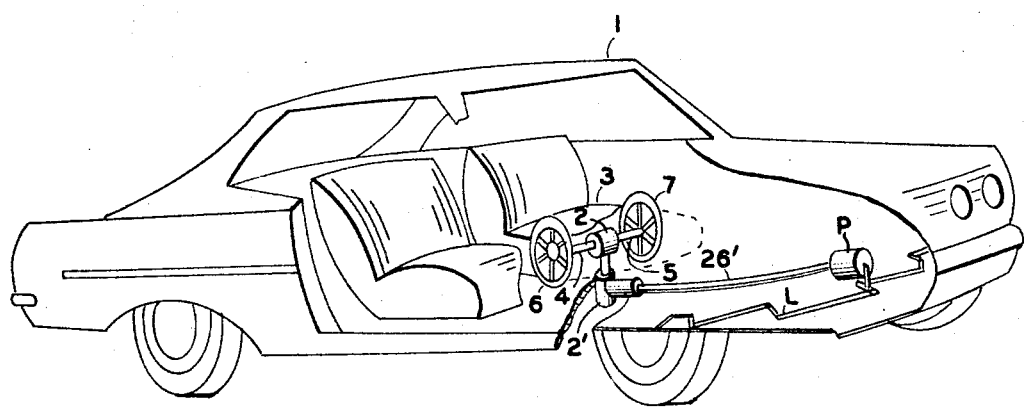
FIGURE 1 is a perspective view partially cut away of an embodiment of the invention.

Referring to the figures, vehicle 1 is conventional in all respects except that the steering wheel and steering post have been removed.

The present invention comprises a gear box 2 which is mounted below the drivers seat 3. A pair of horizontal shafts 4 and 5 extend from the gear box to just beyond the sides of the drivers seat and a pair of hand wheels 6 and 7 are fixedly connected to the shafts at their ends. The shafts are geared together as will be explained for counter rotation and they are preferably arranged so that when the top of the right hand wheel 6 is jushed forwardly, the top of the left hand wheel 7 will move rearwardly and the vehicle will be steered to the left. One or both hands may be used.

The gear box is mounted on a floor frame member of the vehicle and its output shaft extends into a lower gear box 2'. The output shaft of the lower gear box may be a flexible shaft 26' and it is connected to the conventional steering linkage either directly through an adapter or through a power steering unit.

Figure 2:
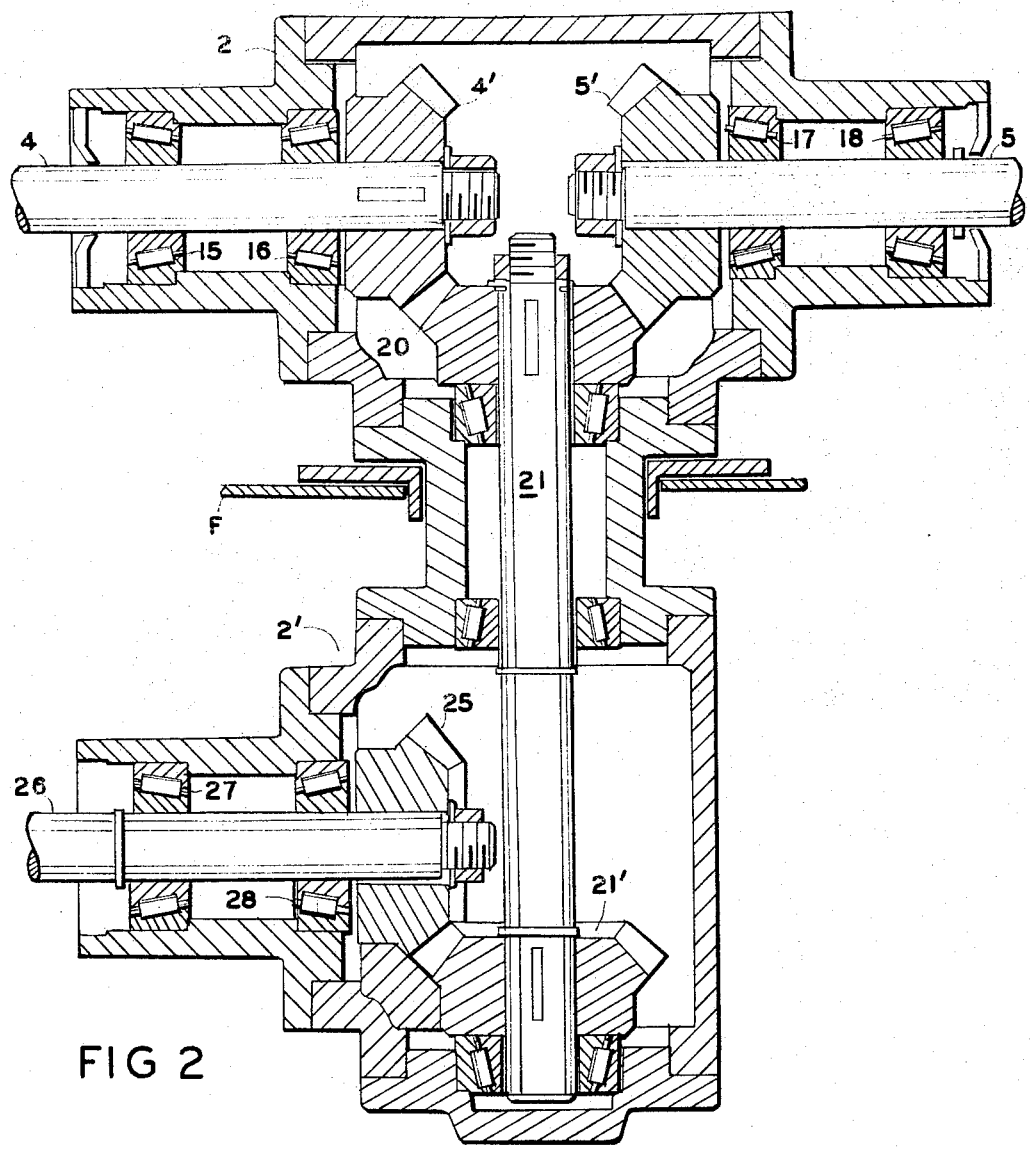
FIGURE 2 is a detail sectional view of the gear box means, the lower half being rotated 90° from operating connection in order to show all the parts.

Referring to FIGURE 2, there is shown a sectional view of the gear box 2. The horizontal arms 4 and 5 are mounted by means of the bearings 15, 16, 17 and 18 and are fixedly connected to the bevel gears 4' and 5', respectively which are rotatably mounted in the gear box.

The output bevel gear 20 is geared to the gears 4' and 5' and is fixedly connected to a vertical shaft 21 which extends to a lower gear box 2' which is located below the floor F level.

The vertical shaft 21 is mounted by means of bearings 22, 23, and 24. Fixedly connected to the lower end of vertical shaft 21 is a gear 21' which is geared to gear 25 which is fixedly connected to the output shaft 26. The output shaft 26 is mounted in the gear box by means of the bearings 27 and 28. Fixedly connected to the shaft 26 is a flexible shaft 26' which extends to the conventional steering linkage L of the vehicle either directly or through a conventional power steering unit P.

In a typical installation the conventional steering post is uncoupled at the steering box and the new flexible or other shaft coupled in. This coupling is generally a flange coupling or a universal joint coupling.

In the showing of FIGURE 2, the lower portion of the gear box would normally be rotated 90° so that the output shaft would extend in the forward direction.

The flexible shaft will vary in length for particular vehicles and it is connected to the conventional power steering unit or directly to the steering linkage. For direct connection an adapter is preferably used to rotatably mount and support the forward end of the flexible shaft.

Alternatively, the flexible shaft could be replaced with conventional shafting with suitable gears and universal joints. However, the flexible shaft is preferable for easy installation. The flexible shaft is about ¾ inch in diameter to provide the necessary strength.

The present invention may be made in kit form for installation in conventional vehicles. The flexible shaft provides easy installation for different types of vehicles having different spacings of the parts to be connected.

Therefore, the present invention provides a steering gear mechanism which eliminates the conventional steering post and wheel with its dangerous potentialities in the event of an accident. In addition the arms of the user are placed at his side in a more relaxed and comfortable position than with the conventional steering mechanism. His arms are also resting against his body which is a much more stable position than with the conventional steering wheel.

In using the present wheel, the vehicle may be easily steered with one hand and the steering may be made with one hand wheel. However, it is preferable to use two hands on the wheels for a feeling of balance. Only one control wheel may be installed if desired.

Alternatively, the handle(s) or wheel(s) could be mounted to rotate in a plane perpendicular to the axis of the vehicle, and forward of the driver so that the driver could rest his arms on the side rail of the seat and hold the wheels. Also, the control wheels may be mounted to rotate in the same direction if desired.

Many modifications may be made by those who desire to practice the invention without departing from the scope thereof which is defined by the following claim.

I claim:

Steering wheel means for a vehicle having a driver's seat and a steering linkage extending between the front wheels of the vehicle comprising, a gear box having upper and lower portions mounted in the floor board of the vehicle, said upper portion located under the substantially horizontal portion of said drivers seat, said lower portion having a flange adapted to rest on said floor board, the remainder of said lower portion extending below said floor board, a pair of horizontal shafts extending from the upper portion of said gear box to just beyond the side of said drivers seat, a pair of hand wheels, one mounted on each of said shafts, gear means in said gear box connecting said wheels and shafts for counter rotation, an output shaft in said gear box connected to said gear means and, means to connect said output shaft to said steering linkage.

References Cited by the Examiner

UNITED STATES PATENTS

| | | |
|---|---|---|
| 1,901,276 | 3/1933 | Adams. |
| 2,132,107 | 10/1938 | Hamm. |
| 2,198,407 | 4/1940 | De Brun. |
| 2,618,447 | 11/1952 | Lecarme. |
| 3,086,607 | 4/1963 | Cota _____ 180—79.2 |
| 3,176,537 | 4/1965 | Zeigler _____ 180—90 X |
| 3,186,729 | 6/1965 | Vacante _____ 280—87 |

FOREIGN PATENTS

| | | |
|---|---|---|
| 1,040,847 | | France. |
| 1,241,651 | | France. |
| 1,304,021 | | France. |
| 664,316 | 1/1952 | Great Britain. |
| 299,688 | 7/1932 | Italy. |

KENNETH H. BETTS, *Primary Examiner.*